US012784411B2

(12) United States Patent
Gandelsman et al.

(10) Patent No.: US 12,784,411 B2
(45) Date of Patent: Nov. 3, 2026

(54) EMBEDDING AN INPUT IMAGE TO A DIFFUSION MODEL

(71) Applicant: ADOBE INC., San Jose, CA (US)

(72) Inventors: Yosef Gandelsman, Berkeley, CA (US); Taesung Park, San Francisco, CA (US); Richard Zhang, Burlingame, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 621 days.

(21) Appl. No.: 18/053,556

(22) Filed: Nov. 8, 2022

(65) Prior Publication Data

US 2024/0161462 A1 May 16, 2024

(51) Int. Cl.

| | |
|---|---|
| ***G06V 10/774*** | (2022.01) |
| ***G06T 5/70*** | (2024.01) |
| ***G06T 11/00*** | (2026.01) |
| ***G06V 10/776*** | (2022.01) |
| ***G06V 10/82*** | (2022.01) |
| ***G06V 10/94*** | (2022.01) |

(52) U.S. Cl.

CPC .............. *G06V 10/774* (2022.01); *G06T 5/70* (2024.01); *G06T 11/00* (2013.01); *G06V 10/776* (2022.01); *G06V 10/82* (2022.01); *G06V 10/945* (2022.01); *G06T 2200/24* (2013.01); *G06T 2207/20081* (2013.01); *G06T 2207/20084* (2013.01)

(58) Field of Classification Search

CPC .. G06V 10/774; G06V 10/945; G06V 10/776; G06V 10/82; G02B 2027/0187; G06T 2207/20084; G06T 2207/20081; G06T 2200/24; G06T 11/00; G06T 5/70

See application file for complete search history.

(56) References Cited

U.S. PATENT DOCUMENTS

| | | | | |
|---|---|---|---|---|
| 2023/0095092 | A1* | 3/2023 | Xiao | G06T 5/70 382/254 |
| 2023/0103638 | A1* | 4/2023 | Saharia | G06V 10/454 382/155 |
| 2024/0070816 | A1* | 2/2024 | Jandial | G06V 10/774 |
| 2024/0152695 | A1* | 5/2024 | Shukla | G06F 40/56 |
| 2024/0153151 | A1* | 5/2024 | Yan | G06T 5/70 |
| 2024/0153152 | A1* | 5/2024 | Liu | G06T 5/70 |
| 2024/0153153 | A1* | 5/2024 | Liu | G06T 5/70 |
| 2024/0153194 | A1* | 5/2024 | Liu | G06F 40/30 |

(Continued)

OTHER PUBLICATIONS

Ho, Jonathan, Ajay Jain, and Pieter Abbeel. “Denoising diffusion probabilistic models.” Advances in neural information processing systems 33 (2020): 6840-6851. (Year: 2020).*

(Continued)

*Primary Examiner* — John Villecco
*Assistant Examiner* — Alexander John Rodgers
(74) *Attorney, Agent, or Firm* — F. CHAU & ASSOCIATES, LLC

(57) ABSTRACT

Systems and methods for image editing are described. Embodiments of the present disclosure include obtaining an image and a prompt for editing the image. A diffusion model is tuned based on the image to generate different versions of the image. The prompt is then encoded to obtain a guidance vector, and the diffusion model generates a modified image based on the image and the encoded text prompt.

17 Claims, 13 Drawing Sheets

(56) References Cited

U.S. PATENT DOCUMENTS

| | | | | |
|---|---|---|---|---|
| 2024/0153259 | A1* | 5/2024 | Motiian | G06V 10/751 |
| 2024/0161327 | A1* | 5/2024 | Chen | G06T 3/40 |
| 2024/0169622 | A1* | 5/2024 | Xie | G06T 11/10 |

OTHER PUBLICATIONS

Kim, Gwanghyun, Taesung Kwon, and Jong Chul Ye. "Diffusionclip: Text-guided diffusion models for robust image manipulation." Proceedings of the IEEE/CVF conference on computer vision and pattern recognition. 2022. (Year: 2022).*

Gu, Shuyang, et al. "Vector quantized diffusion model for text-to-image synthesis." Proceedings of the IEEE/CVF conference on computer vision and pattern recognition. 2022. (Year: 2022).*

Sohl-Dickstein, Jascha, et al. "Deep unsupervised learning using nonequilibrium thermodynamics." International conference on machine learning. pmlr, 2015. (Year: 2015).*

Kawar, et al. "Imagic: Text-Based Real Image Editing with Diffusion Models." arXiv preprint arXiv:2210.09276v1 [cs.CV] Oct. 17, 2022, 13 pages.

* cited by examiner

EMBEDDING AN INPUT IMAGE TO A DIFFUSION MODEL

BACKGROUND

The following relates generally to image processing, and more specifically to image generation using machine learning.

Image processing is a type of data processing that involves manipulating or generating image data. Recently, machine learning (ML) models have been used in advanced image processing techniques. Among these ML models, diffusion models and other generative models such as generative adversarial networks (GANs) have been used for various tasks including generating images with perceptual metrics, generating images in conditional settings, image inpainting, and image manipulation.

Diffusion models are a category of machine learning model that generates data based on stochastic processes. Specifically, diffusion models introduce random noise at multiple levels and train a network to remove the noise. Once trained, a diffusion model can start with random noise and generate data similar to the training data.

SUMMARY

Embodiments of the present disclosure include a machine learning model trained to produce output images consistent with a given input image. In some examples, a pre-trained diffusion model is tuned based on a single target image so that the output of the model consistently maintains similarities to the target image. Then the model can be used to generate additional versions of the image. These additional versions can include additional elements consistent with text guidance provided by a user, while retaining elements of the target image.

A method, apparatus, and non-transitory computer readable medium for image generation are described. One or more aspects of the method, apparatus, and non-transitory computer readable medium include obtaining an image and a prompt for editing the image; encoding the prompt to obtain a guidance vector; and generating a modified image based on the image and the text prompt using a diffusion model that has been trained on the image to generate different versions of the image.

An apparatus and method for image generation are described. One or more aspects of the apparatus and method include fine-tuning a pre-trained diffusion model based on a single image to obtain a tuned diffusion model; receiving a prompt including additional content for the single image; and generating a modified image based on the single image and the prompt using the tuned diffusion model.

An apparatus and method for image generation are described. One or more aspects of the apparatus and method include one or more processors; one or more memories including instructions executable by the one or more processors to obtain an image and a prompt for editing the image; fine-tune a pre-trained diffusion model based on the image to obtain a tuned diffusion model; and generate a modified image based on the image and the prompt using the tuned diffusion model.

DETAILED DESCRIPTION

Figure 1:
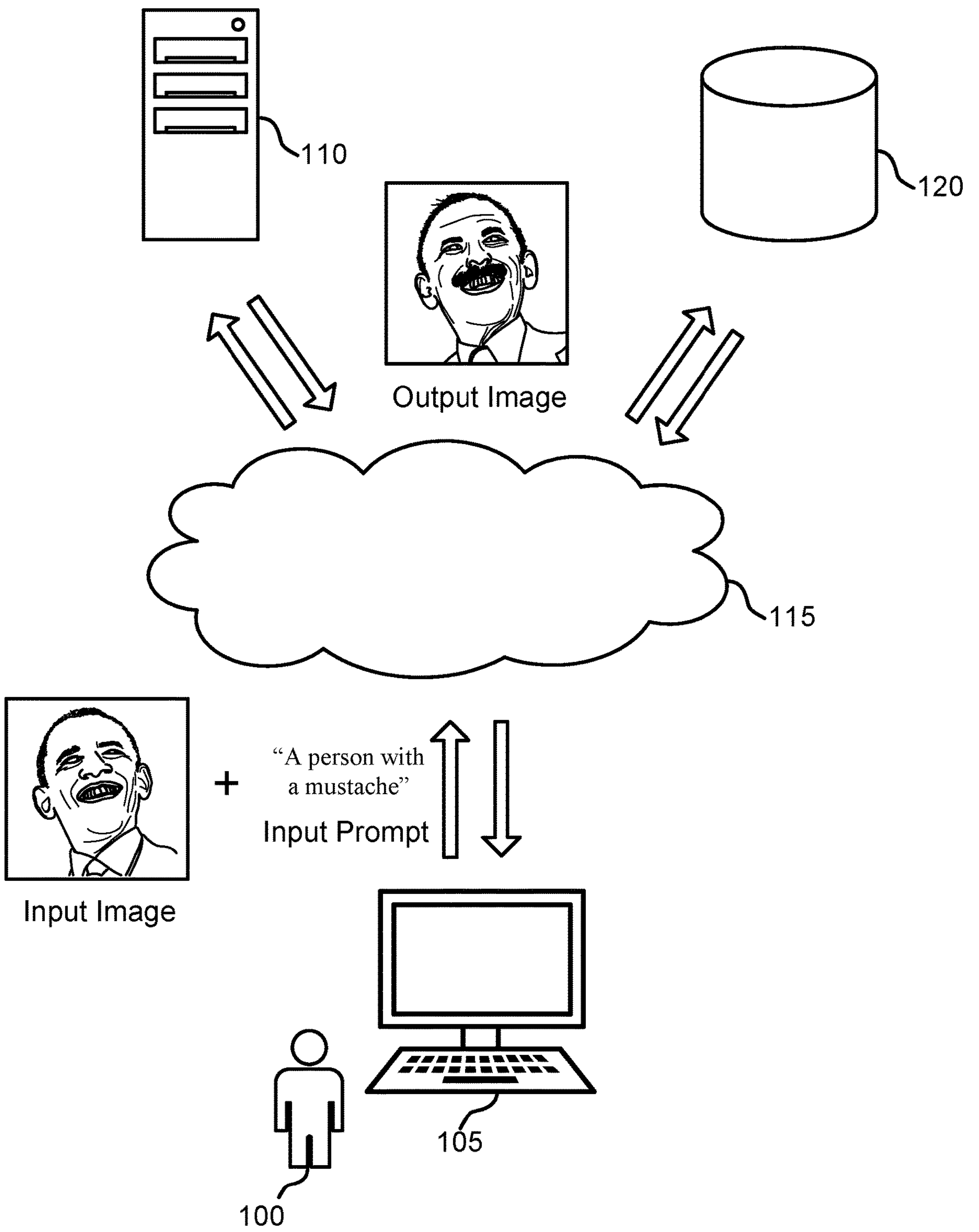
FIG. 1 shows an example of an image generation system according to aspects of the present disclosure.

The present disclosure relates to using a machine learning model for generating images. Embodiments of the disclosure include a diffusion model trained to generate output that resembles a single target image. Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Diffusion models work by iteratively adding noise to the data during a forward process and then learning to recover the data by denoising the data during a reverse process. For example, during training, a guided diffusion model may take an original image in a pixel space as input and apply forward diffusion process to gradually add noise to the original image to obtain noisy images at various noise levels. Next, a reverse diffusion process gradually removes the noise from the noisy images at the various noise levels to obtain an output image. In some cases, an output image is created from each of the various noise levels. The output image can be compared to the original image to train the reverse diffusion process.

The reverse diffusion process can be guided based on a text prompt, or another guidance prompt, such as an image, a layout, a segmentation map, etc. However, diffusion models are highly stochastic. The random noise introduced at various noise levels in diffusion models makes the output diverse. Although diffusion models can generate images based on a text prompt, the images generated are diverse. For example, even with very detailed description of an input image, the random noise introduced at various noise levels will make the output images diverse. However, because they generate images based on random noise, some diffusion models are not trained to generate output images that resemble a target image.

The present disclosure uses diffusion models to generate images that retain the identity of a target image (i.e., recognizable characteristics that are not captured in a semantic label). By fine-tuning a diffusion model on a single target image, embodiments of the present disclosure can generate variations of the target image that retain the identity of the original. Accordingly, embodiments of the disclosure provide an improvement over conventional diffusion-based image generation models by producing various outputs that resemble a single target image, even if additional guidance is provided that changes characteristics of the original.

Embodiments of the present disclosure include an optimization-based method including embedding the input image in a latent text embedding space of a pre-trained diffusion model, fine-tuning the pre-trained diffusion model to generate a tuned diffusion model, and generating images similar to the user-provided image in terms of content, composition, and style using the tuned diffusion model. The tuned diffusion model can perform various edits base within a single framework and generate variations of the input image.

Embodiments of the present disclosure generates a tuned diffusion model that allows a user to do text-based manipulation of the input image. For example, the tuned diffusion model generates variations of the input image based on text prompts. In this example, a text prompt describes a modification of the input image, and a generated variation of the input image represents the input image modified as the text prompt describes.

Details regarding the architecture of an image generation system are provided with reference to FIGS. 1-5 and 13. Details of methods for generating an image that represents the input image and text prompt are provided with reference to FIGS. 6-9. Training methods are discussed with reference to FIGS. 10-12.

Accordingly, embodiments speed up the process of editing images and by enabling users to automatically generate new images using an existing image and a prompt for editing the image. Furthermore, because a diffusion model is used to generate the new image, multiple variations of the image can be generated. This can increase the quality of the output by giving the user different options to compare. Furthermore, since embodiments are based on fine-tuning a pre-trained model based on a single image, training time for the model can be reduced while capturing the advantages of using a large amount of training data.

Image Generation System

FIG. 1 shows an example of an image generation system according to aspects of the present disclosure. The example shown includes user 100, user device 105, image processing apparatus 110, cloud 115, and database 120. Image processing apparatus 110 can be an example of, or includes aspects of, the corresponding element described with reference to FIGS. 2 and 13.

In an example process, user 100 provides an input image and a text prompt to the system via a user interface on user device 105. In some cases, the text prompt describes a modification to the image. In one example, the input image is an image of a specific person, the text prompt is "a person with a mustache".

Image processing apparatus 110 receives the input and processes it using a diffusion model. In some cases, the processing synthesizes a variation of the input image in a way described by the text prompt. Then, the system provides the output image to user 100 through the user interface. For example, given an input image of a specific person and text prompt "a person with a mustache" (or wearing glasses, etc.), a generated variation of the input image can be an image that represents the identity of that specific person and depicts the person with a mustache (or wearing glasses).

One or more components of image processing apparatus 110 may be implemented on a server, or multiple servers connected through cloud 115. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Embodiments of the image processing system include a database, such as database 120. Database 120 may contain a library of images, training data, model parameters, or other information used by the system to synthesize images. A database is an organized collection of data. For example, a database stores data in a specified format known as a schema. A database may be structured as a single database, a distributed database, multiple distributed databases, or an emergency backup database. In some cases, a database controller may manage data storage and processing in database 120. In some cases, user 100 interacts with the database controller. In other cases, the database controller may operate automatically without user interaction.

Cloud 115 is used to transfer information between user 100, database 120, and image processing apparatus 110. Cloud 115 refers to a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
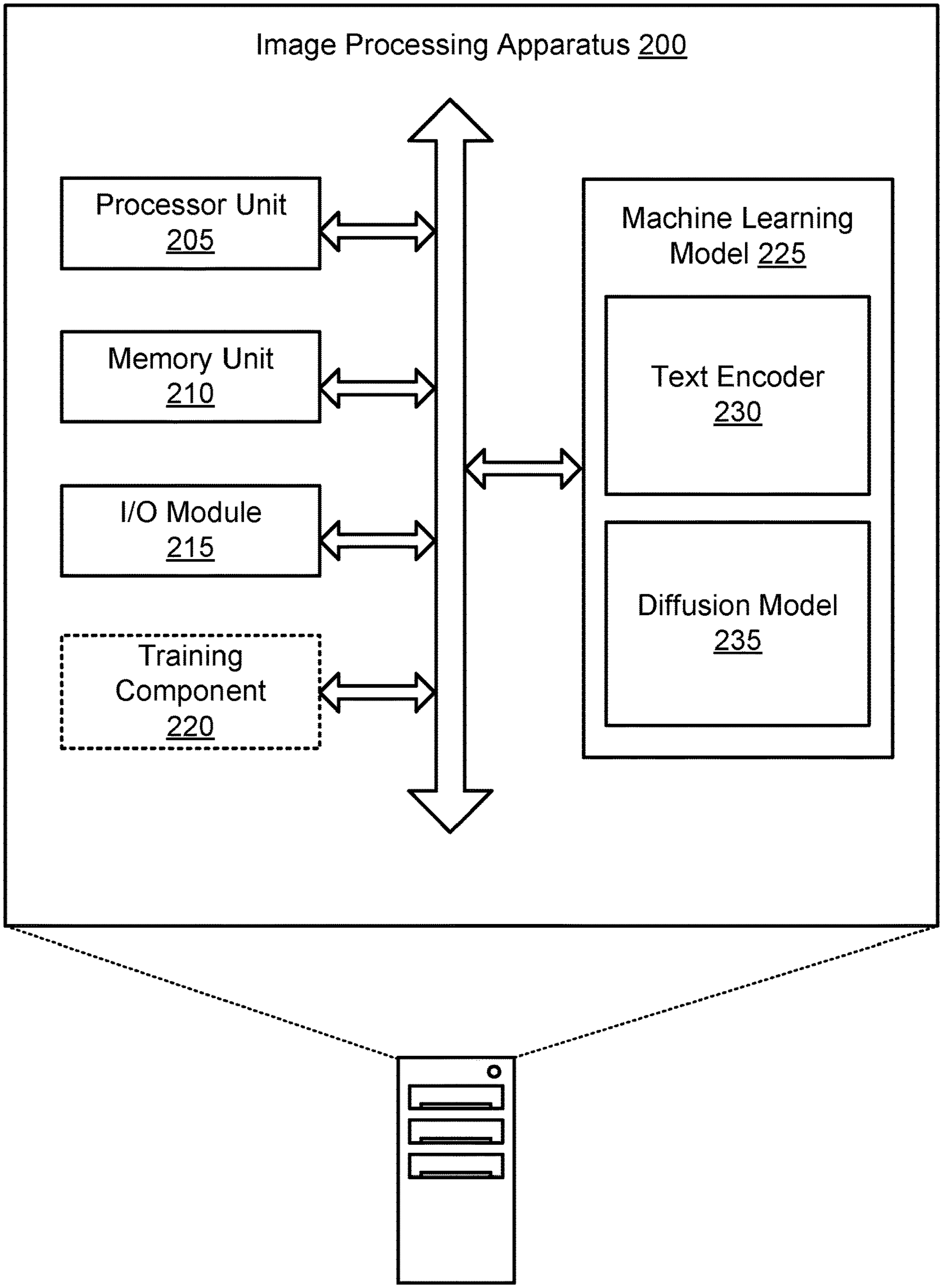
FIG. 2 shows an example of an image generation apparatus according to aspects of the present disclosure.

FIG. 2 shows an example of an image generation apparatus 200 according to aspects of the present disclosure. In one aspect, image generation apparatus 200 includes processor unit 205, memory unit 210, I/O module 215, training component 220, and machine learning model 225. According to some aspects, processor unit 205 includes one or more processors. Processor unit 205, memory unit 210, and I/O module 215 may be examples of the corresponding components described with reference to FIG. 13.

In some embodiments, image processing apparatus 200 receives an input and processes it using diffusion model 235. In some cases, the processing synthesizes a variation of the input image in a way the text prompt describes the image. Then, the system provides the output image to a user.

According to some aspects, training component 220 trains and fine-tunes the diffusion model 235. In some examples, training component 220 trains the diffusion model 235 based on a diverse training set and fine-tunes the diffusion model 235 based on a single target image. In some aspects, a first weight for a loss function is used for pre-training the diffusion model 235 and a second weight for the loss function that is different from the first weight is used for fine-tuning the diffusion model 235. In some aspects, the diffusion model 235 is fine-tuned to generate an output resembling the image based on input provided.

In one embodiment, training component 220 initializes a noise map, and computes a loss function by comparing each of the set of intermediate images to the image, where the diffusion model 235 is fine-tuned based on the loss function. In some examples, training component 220 adds noise at the different noise levels to the image to obtain a set of noisy images, where the comparison is based on an intermediate image of the set of intermediate images and a corresponding noisy image of the set of noisy images having a corresponding noise level. In some examples, training component 220 selects the set of intermediate images at random from a superset of intermediate images generated by the pre-trained diffusion model 235. In some examples, training component 220 is a part of another apparatus other than image processing apparatus 200.

According to some aspects, machine learning model 225 includes a diffusion model 235 that is fine-tuned based on a single image. In some examples, machine learning model 225 receives a prompt including additional content for the single image. In one example, an input image is a single image of a specific person without glasses, and the text prompt is “a person with a mustache” (or wearing glasses).

In one aspect, machine learning model 225 includes text encoder 230 and diffusion model 235. Text encoder 230 and diffusion model 235 are examples of, or includes aspects of, the corresponding elements described with reference to FIG. 3.

According to some aspects, text encoder 230 obtains an image and a prompt for editing the image. In some examples, text encoder 230 encodes the prompt to obtain a guidance vector. In some aspects, the prompt includes text that describes a modification to the image, where the modified image includes the modification.

In one example, text encoder 230 comprises a Contrastive Language-Image Pre-training (CLIP) model. CLIP is a contrastive learning model trained for image representation learning using natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset’s classes.

For pre-training, CLIP is trained to predict which of the possible (image, text) pairings across a batch actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings. A symmetric cross entropy loss is optimized over these similarity scores.

In some cases, the prompt can be encoded to obtain guidance features in guidance space. In some cases, the guidance features can be combined with the noisy images at one or more layers of the reverse diffusion process to ensure that the output image includes content described by the prompt. For example, guidance features can be combined with the noisy features using a cross-attention block within a reverse diffusion process.

Figure 3:
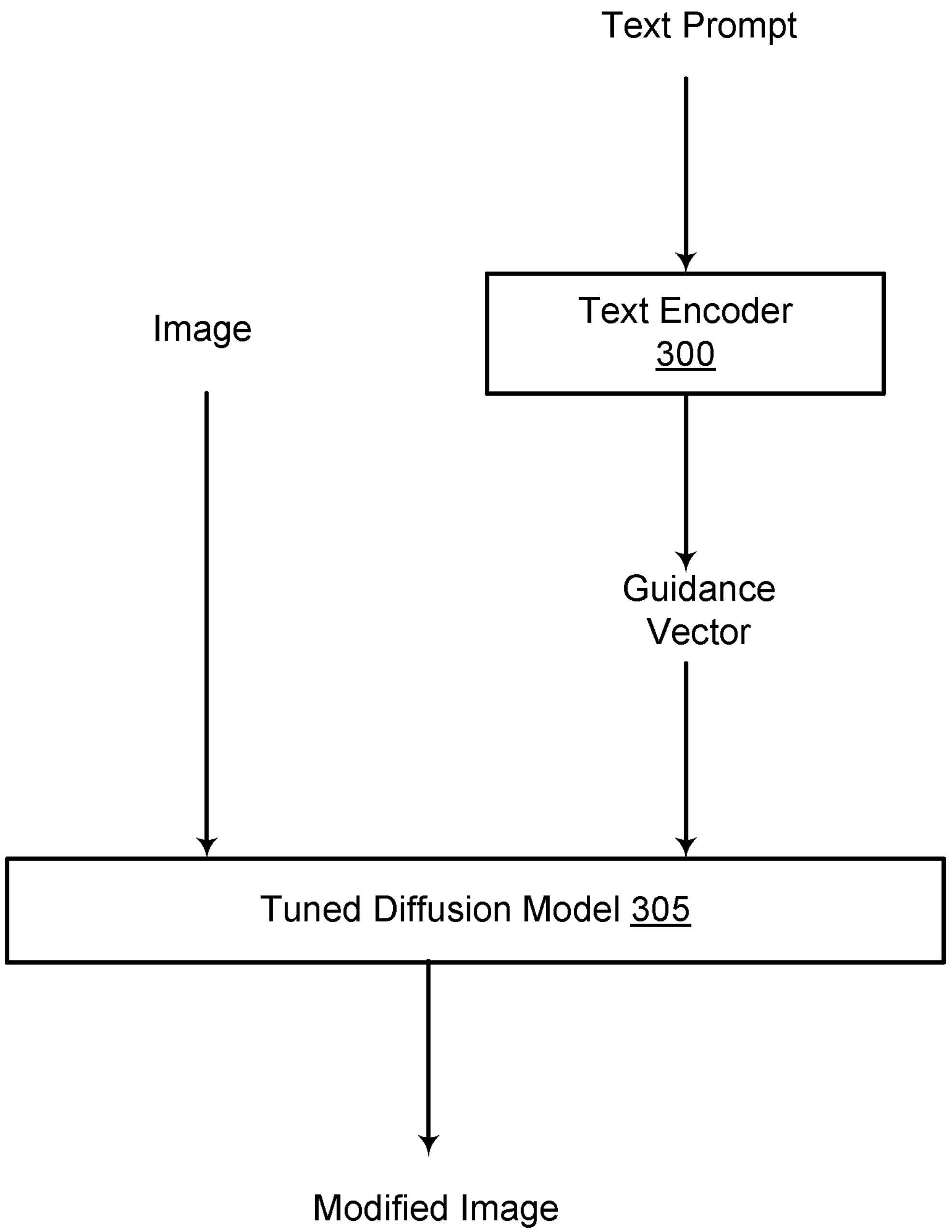
FIG. 3 shows an example of image generation according to aspects of the present disclosure.

FIG. 3 shows an example of image generation according to aspects of the present disclosure. The example shown includes text encoder 300 and tuned diffusion model 305. According to some embodiments, a singe target image may be used to tune a diffusion model to obtain tuned diffusion model 305. Then tuned diffusion model 305 can be used to generate variations on the image, e.g., based on the text prompt.

According to some aspects, tuned diffusion model 305 generates a modified image based on the image and the text prompt. In some cases, tuned diffusion model 305 that has been trained on the image to generate different versions of the image. In some aspects, the modified image retains an identity of an object in the image. In some examples, tuned diffusion model 305 combines the guidance vector with image features within the diffusion model, and the modified image is based on the guidance vector.

Figure 4:
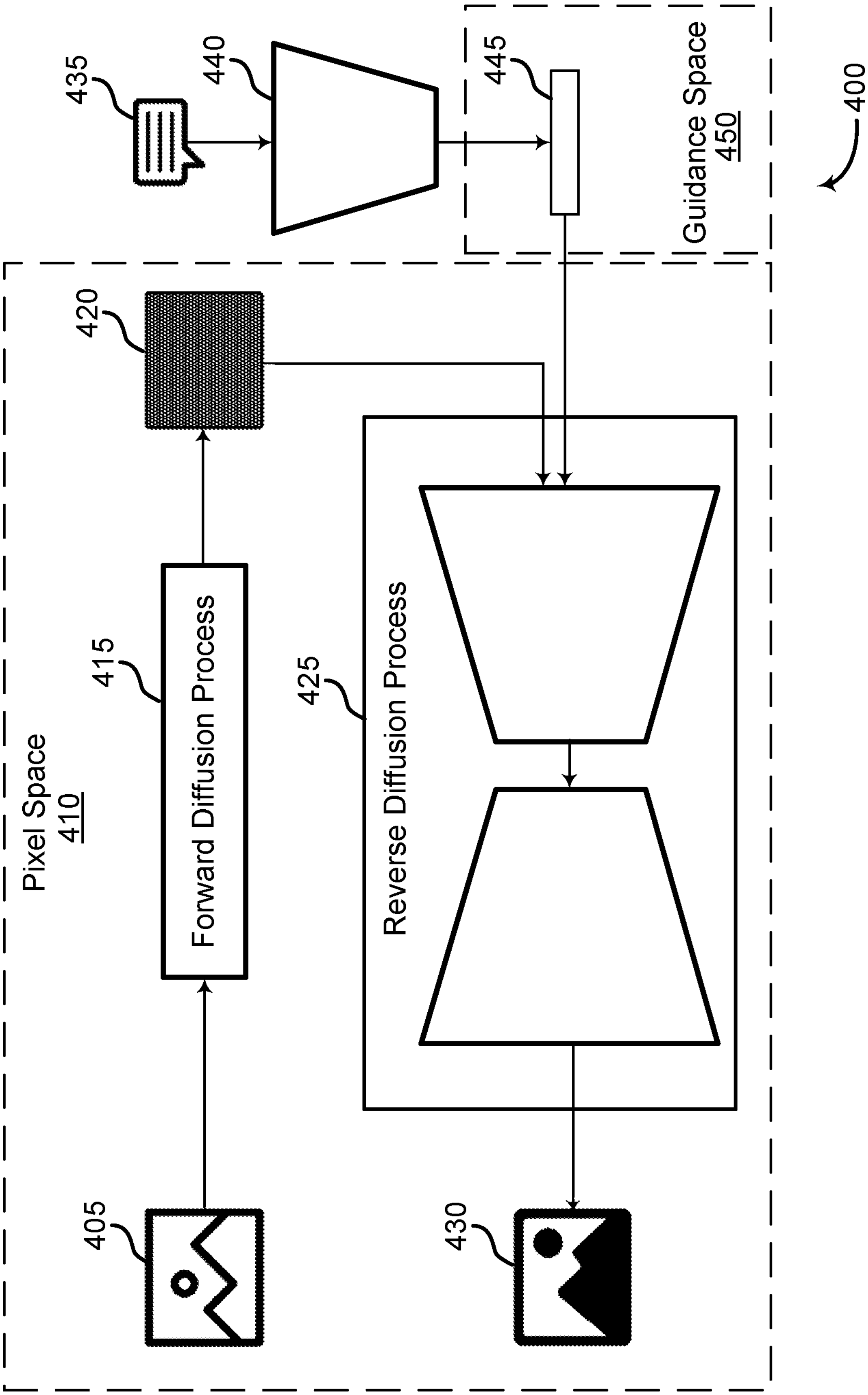
FIG. 4 shows an example of a guided diffusion model according to aspects of the present disclosure.

FIG. 4 shows an example of a guided diffusion model 400 according to aspects of the present disclosure. The guided diffusion model 400 depicted in FIG. 4 is an example of, or includes aspects of, the corresponding element described with reference to FIGS. 2, 3, 4, 5, 9, and 10. Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided diffusion model 400 may take an original image 405 in a pixel space 410 as input and apply forward diffusion process 430 to gradually add noise to the original image 405 to obtain noisy images 420 at various noise levels.

Next, a reverse diffusion process 425 (e.g., a U-Net ANN) gradually removes the noise from the noisy images 420 at the various noise levels to obtain an output image 430. In some cases, an output image 430 is created from each of the various noise levels. The output image 430 can be compared to the original image 405 to train the reverse diffusion process 425.

The reverse diffusion process 425 can also be guided based on a text prompt 435, or another guidance prompt, such as an image, a layout, a segmentation map, etc. The text prompt 435 can be encoded using a text encoder 465 (e.g., a multi-modal encoder) to obtain guidance features 445 in guidance space 450. The guidance features 445 can be combined with the noisy images 420 at one or more layers of the reverse diffusion process 425 to ensure that the output image 430 includes content described by the text prompt 435. For example, guidance features 445 can be combined with the noisy features using a cross-attention block within the reverse diffusion process 425.

Figure 5:
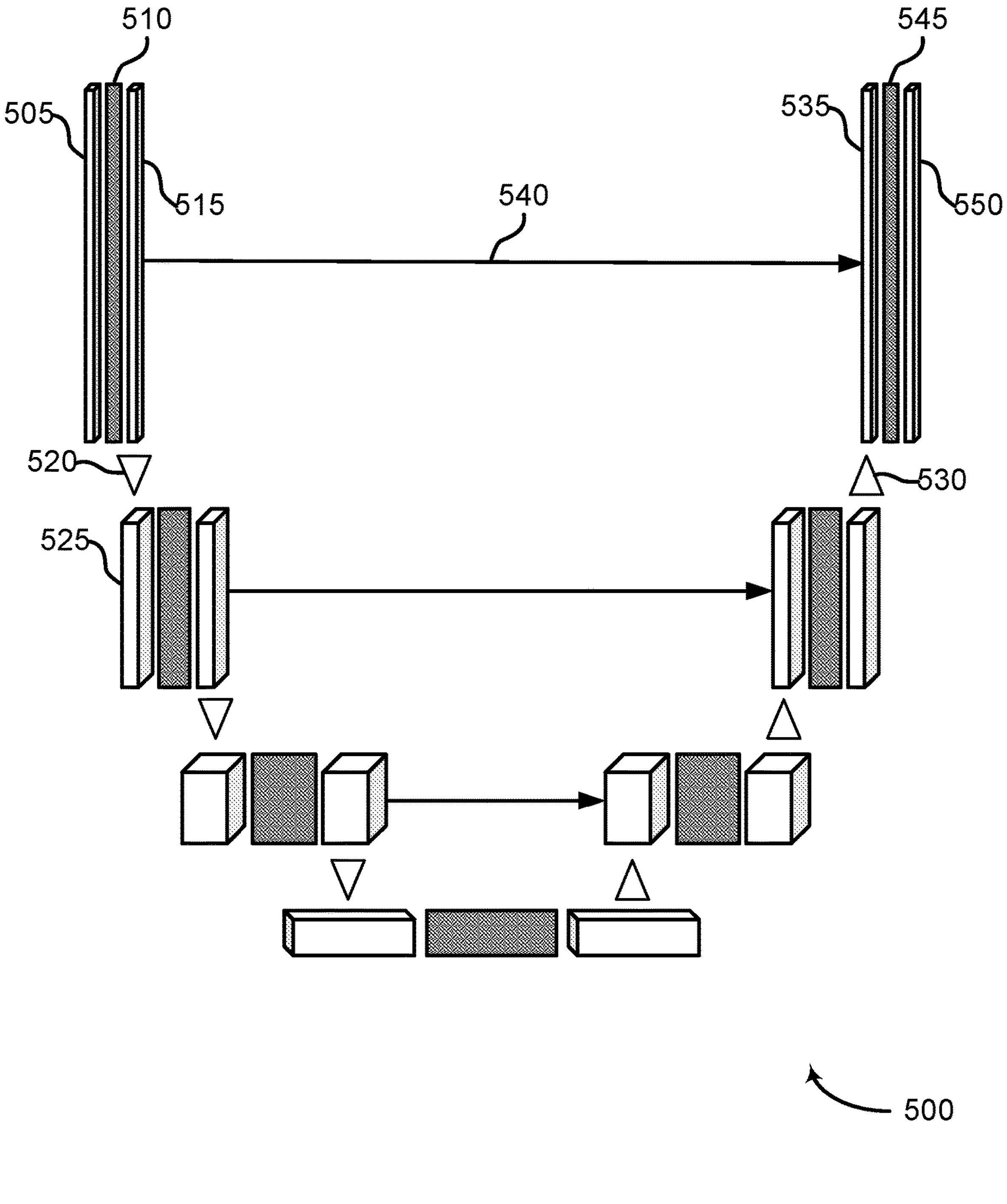
FIG. 5 shows an example of a diffusion model using a U-Net according to aspects of the present disclosure.

FIG. 5 shows an example of a diffusion model using a U-Net 500 according to aspects of the present disclosure.

In some examples, diffusion models are based on a neural network architecture known as a U-Net. The U-Net 500 takes input features 505 having an initial resolution and an initial number of channels, and processes the input features 505 using an initial neural network layer 510 (e.g., a convolutional network layer) to produce intermediate features 515. The intermediate features 515 are then down-sampled using a down-sampling layer 515 such that the features have a resolution less than the initial resolution and a number of channels greater than the initial number of channels.

This process is repeated multiple times, and then the process is reversed. That is, the down-sampled features are up-sampled using up-sampling process 515 to obtain up-sampled features 535. The up-sampled features 535 can be combined with intermediate features 515 having a same resolution and number of channels via a skip connection 540. These inputs are process using a final neural network layer 545 to produce output features 550. In some cases, the output features 550 have the same resolution as the initial resolution and the same number of channels as the initial number of channels.

In some cases, U-Net 500 takes additional input features to produce conditionally generated output. For example, the additional input features could include a vector representation of an input prompt. The additional input features can be combined with the intermediate features 515 within the neural network at one or more layers. For example, a cross-attention module can be used to combine the additional input features and the intermediate features 515.

Image Generation and Modification

Figure 6:
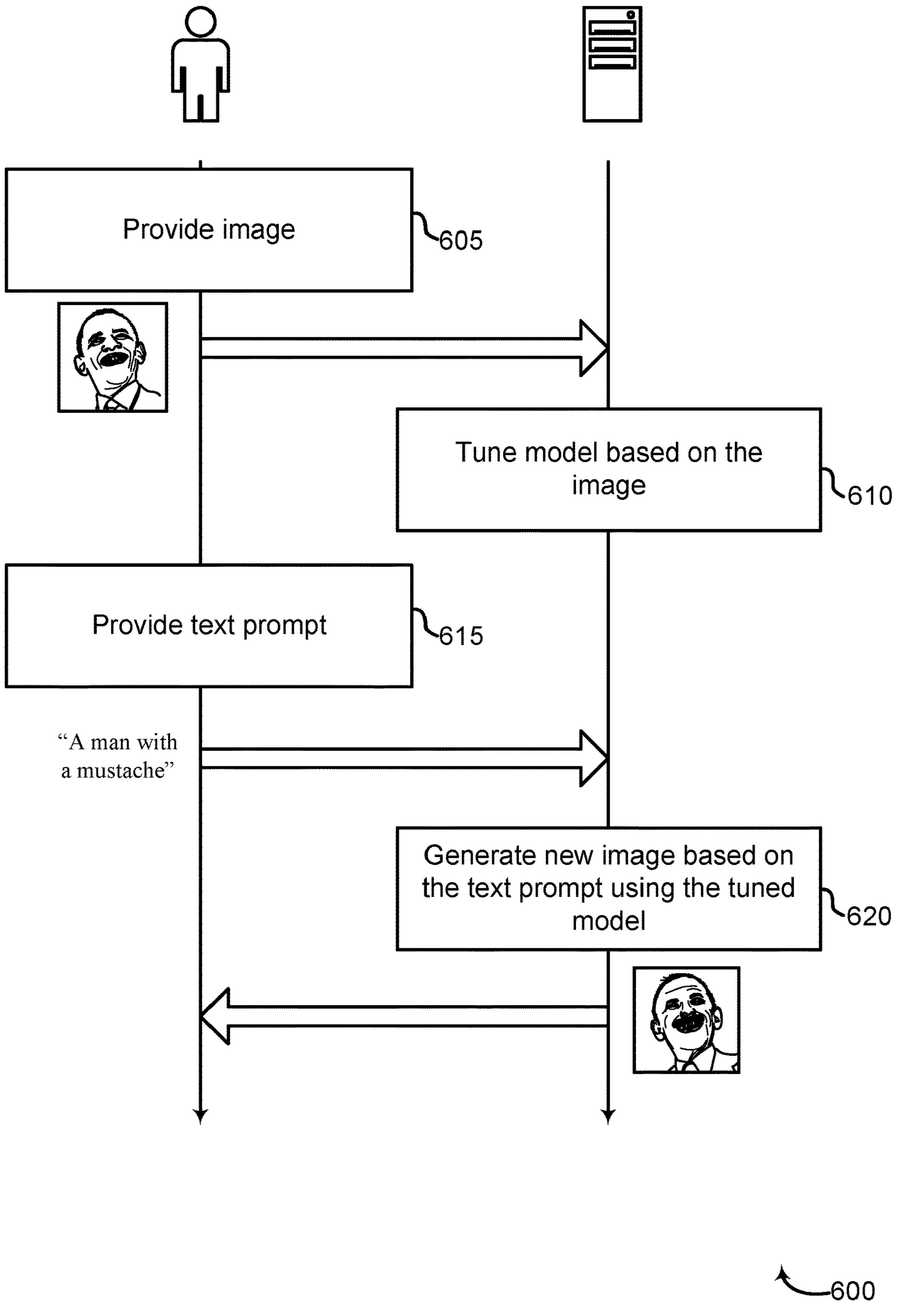
FIG. 6 shows an example of a method for conditional image generation according to aspects of the present disclosure.

FIG. 6 shows an example of a method 600 for conditional image generation according to aspects of the present disclosure. In some examples, these operations are performed by a system including a processor executing a set of codes to control functional elements of an apparatus such as the apparatus described in FIGS. 2, 3, 4, 5.

Additionally or alternatively, steps of the method 600 may be performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides a target image. The target image can have a semantic category (i.e., a face of a person) that includes a wide variety of identifying characteristics within the category that form an identity of each instance within the category. For example, the category could be a face, and the identity could represent the face of a specific person.

At operation 610, the system tunes a diffusion model based on the target image. In some cases, the diffusion model is pre-trained based on a large training set, and fine tuned based on the single image. This can cause the diffusion model to "forget" how to generate images that do not resemble the target image. However, this forgetting can be useful when a user wants to generate variations of a specific image.

At operation 615, the user provides a text prompt for modifying the image. In some cases, the text prompt describes content to be included in a generated image. For example, a user may provide the prompt "a person with a mustache". In some examples, guidance can be provided in a form other than text, such as via an image, a sketch, or a layout.

In some cases, the system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

In some cases, a noise map that includes random noise is initialized. The noise map may be in a pixel space or a latent space. By initializing an image with random noise, a variation of the image including the content described by the conditional guidance can be generated. In some cases, multiple variations of the image can be generated by initializing multiple noise maps. In some cases, each of the multiple variation of the image is generated based on a different noise map of the multiple noise maps.

At operation 620, the system generates a new image based on the noise map and the conditional guidance vector. For example, the image may be generated using a reverse diffusion process as described with reference to FIG. 10. For example, different attributes of a person (i.e., gender, age, glasses, hair, etc.) can be changed while retaining a recognizable identity of the person in the image.

Figure 7:
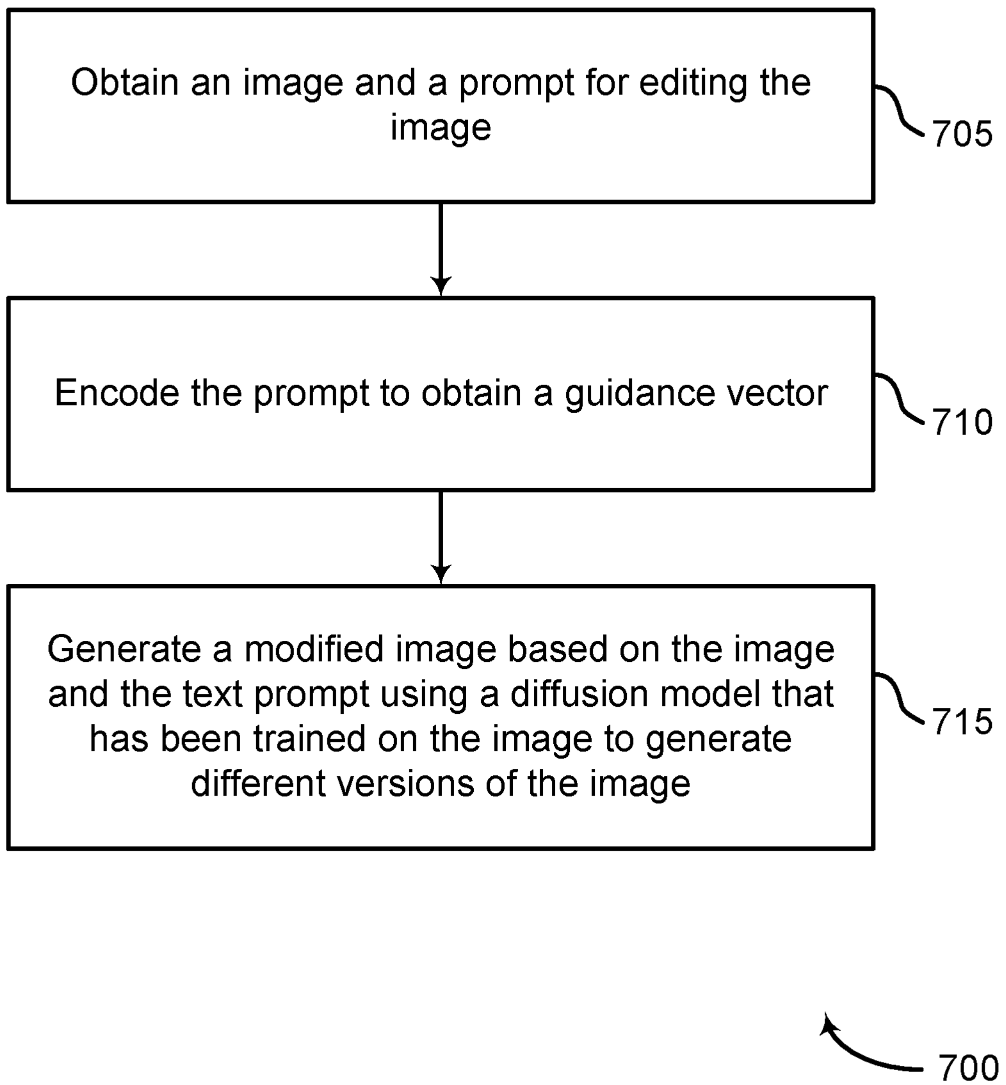
FIG. 7 shows an example of a method for image processing according to aspects of the present disclosure.

FIG. 7 shows an example of a method 700 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains an image and a prompt for editing the image. In some cases, the operations of this step refer to, or may be performed by, a text encoder as described with reference to FIGS. 2 and 3. For example, the text prompt describes a modification that the user wants to be performed on the image. For example, the input image is a single image of a specific person without glasses, and the text prompt is "a person with a mustache" (or wearing glasses).

In some embodiments, a diffusion model can be fine-tuned based on the single image. This modifies the model to produce output images that resemble the single image regardless of the noise map or other initial inputs to the model.

At operation 710, the system encodes the prompt to obtain a guidance vector. In some cases, the operations of this step refer to, or may be performed by, a text encoder as described with reference to FIGS. 2 and 3. In one example, the text prompt is encoded using a multi-modal encoder such as a CLIP encoder.

Image processing apparatus 110 as shown in FIG. 1 receives the input and processes it using a diffusion model.

In some cases, the input includes an input image and a text prompt describing the image. In some cases, the input image is embedded in the diffusion model. In some cases, the processing synthesizes a variation of the input image in a way the text prompt describes the image based on the embedded image and the guidance vector. Then, the system provides the output image to user 100, through, for example, a user interface. For example, a variation of the input image of a specific person and a text prompt of "a person with a mustache" (or wearing glasses) is an image that represents the identity of a specific person and that person with a mustache (or wearing glasses).

At operation 715, the system generates a modified image based on the image and the text prompt using a diffusion model that has been trained on the image to generate different versions of the image. In some cases, the operations of this step refer to, or may be performed by, a diffusion model as described with reference to FIGS. 2 and 3.

According to some embodiments, operation 715 includes an optimization process. The optimization can be run on either the text embedding space of the text encoder or on the weights of the model individually. In some cases, optimization that is run on the text embedding is used to find an image that best matches the given image in the vicinity of the target text embedding. For example, the text embedding is optimized to reconstruct an image that best matches the given image. In some cases, optimization that is run on the weights of the model is used to find a tuned diffusion model that generates images similar to the target image.

According to some embodiments, the optimization process at operation 715 modifies the text embedding and the parameters of the pre-trained diffusion model are kept unchanged. According to some embodiments, the optimization process at operation 715 modifies the weights of the pre-trained diffusion model based on the image provided by the user.

Figure 8:
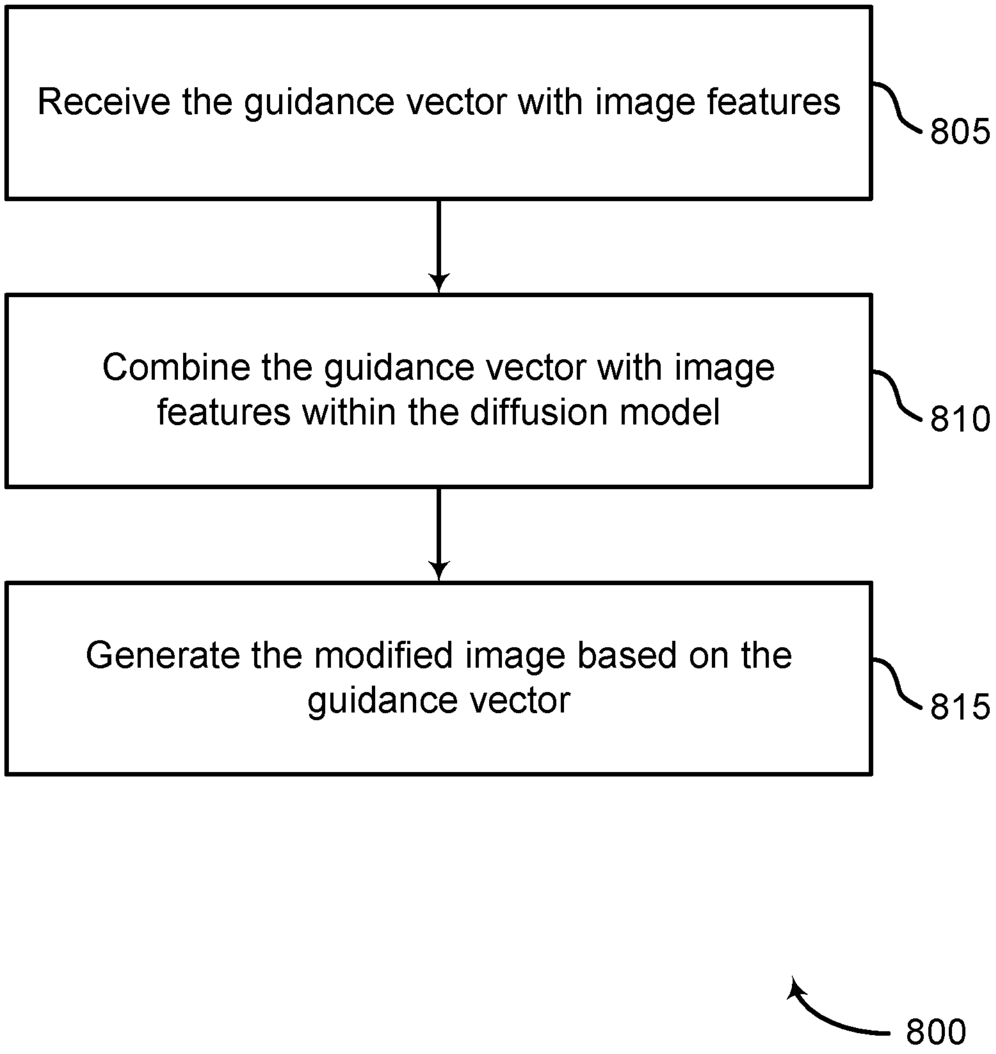
FIG. 8 shows an example of a method for generating a modified image according to aspects of the present disclosure.

FIG. 8 shows an example of a method 800 for generating a modified image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains the guidance vector with image features. For example, the guidance vector may be generated by a transformer encoder, a word embedding model such as word2Vec, or a multi-modal encoder such as CLIP.

At operation 810, the diffusion combines the guidance vector with image features within the diffusion model (i.e., at one or more layers of a U-Net). In some cases, the guidance features can be combined with noisy images at one or more steps of the reverse diffusion process to ensure that the output image includes content described by the text prompt. For example, guidance features can be combined with the noisy features using a cross-attention block within a U-Net model during a reverse diffusion process.

At operation 815, the system generates the modified image based on the guidance vector. In some cases, the tuned diffusion model takes a noise map and a text embedding as input and generates one or more modified images that retain the identity or a target image while also incorporating elements described by the text or other guidance.

Figure 9:
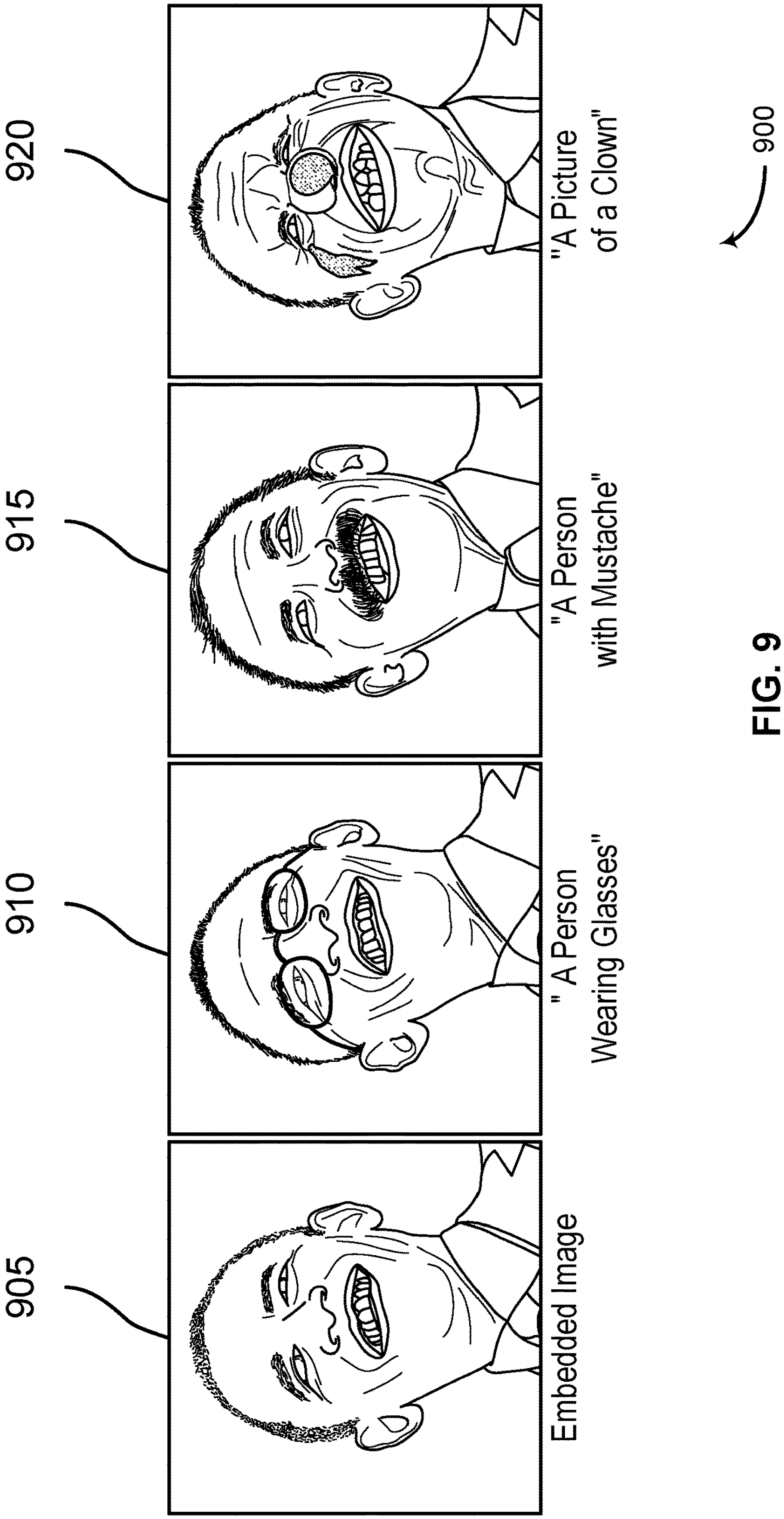
FIG. 9 shows an example of generating modified images based on an image and text prompts according to aspects of the present disclosure.

FIG. 9 shows an example of a method 900 for generating modified images based on an image and text prompts according to aspects of the present disclosure. An input image provided by the user is used to fine-tune a diffusion model. Embedded image 905 is generated based on the input image. First image variation 910, second image variation 915, and third image variation 920 are generated by the diffusion model based on different text prompts that describe desired modifications on the input image. In one example, the diffusion model is tuned based on a single input image. In this example, multiple text prompts describing additional images related to the single input image are provided: "a person wearing glasses", "a person with mustache", and "a picture of a clown". The tuned diffusion model then generates first image variation 910, second image variation 915, and third image variation 920 corresponding to the multiple text prompts describing modifications to the target image 905.

Training

Figure 10:
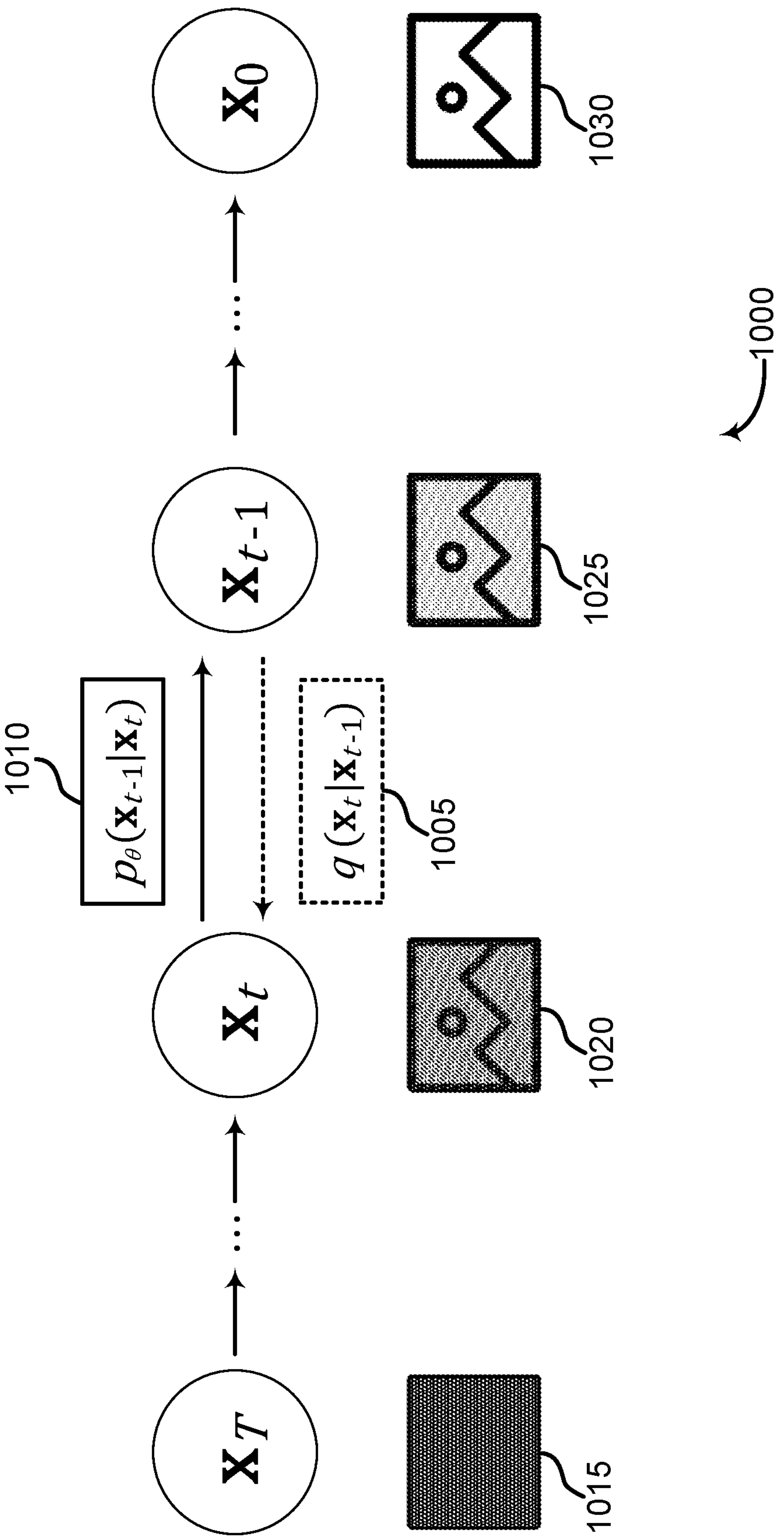
FIG. 10 shows an example of reversed diffusion according to aspects of the present disclosure.

FIG. 10 shows a diffusion process 1000 according to aspects of the present disclosure. As described above with reference to FIGS. 2, 4, 5, and 10. A diffusion model can include both a forward diffusion process 1005 for adding noise to an image (or features in a latent space) and a reverse diffusion process 1010 for denoising the images (or features) to obtain a denoised image. The forward diffusion process 1005 can be represented as $p(x_{t-1}|x_t)$, and the reverse diffusion process 1010 can be represented as $q(x_t|x_{t-1})$. In some cases, the forward diffusion process 1005 is used during training to generate images with successively greater noise, and a neural network is trained to perform the reverse diffusion process 1010 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots x_T$ have the same dimensionality as $x_0$.

The neural network may be trained to perform the reverse process. During the reverse diffusion process 1010, the model begins with noisy data $x_T$, such as a noisy image 1015 and denoises the data to obtain the $p(x_{t-1}|x_t)$. At each step t−1, the reverse diffusion process 1010 takes $x_t$, such as first intermediate image 1020, and t as input. Here, t represents a step in the sequence of transitions associated with different noise levels, The reverse diffusion process 1010 outputs $x_{t-1}$, such as second intermediate image 1025 iteratively until $x_T$ is reverted back to $x_0$, the original image 1030. The reverse process can be represented as:

$$p_\theta(x_{t-1}|x_t) := \mathcal{N}(x_{t-1}; \mu_\theta(x_t,t), \Sigma_\theta(x_t,t)) \quad (1)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1}|x_t), \quad (2)$$

where $p(x_T)=\mathcal{N}(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 11:
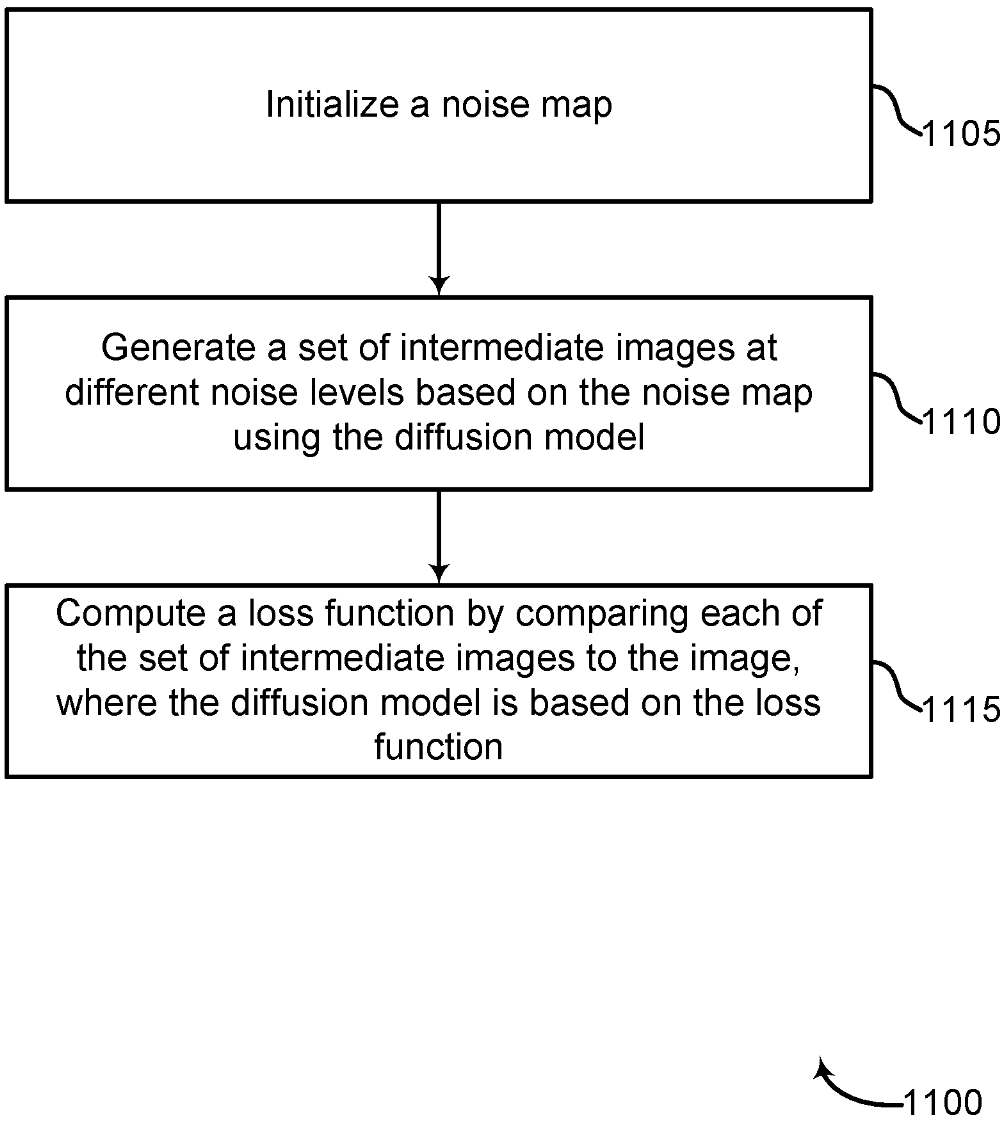
FIG. 11 shows an example of a method for training a machine learning model according to aspects of the present disclosure.

FIG. 11 shows an example of a method 1100 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system initializes a set of noise maps. In some cases, each of the set of noise maps includes random noise. In some cases, the operations of this step refer to, or may be performed by, a training component as described with reference to FIG. 2. By initializing an image with a set of random noise based on the set of noise maps, different variations of an image including the content described by the conditional guidance can be generated.

At operation 1110, the system generates a set of intermediate images corresponding to the set of noise maps at different noise levels using the diffusion model. In some cases, the operations of this step refer to, or may be performed by, a pre-trained diffusion model as described with reference to FIG. 2. In some cases, each of the set of intermediate images is based on a corresponding noise map from the set of noise maps and the image from a training dataset. For example, the intermediate image may be generated during various noise levels based on the noise map using a reverse diffusion process of the pre-trained diffusion model.

At operation 1115, the system compute a loss function by comparing each of the set of intermediate images to the image, where the diffusion model is based on the loss function. In some cases, the operations of this step refer to, or may be performed by, a training component as described with reference to FIG. 2. In some cases, given the input image the user provided, the parameters of the pre-trained diffusion model are fine-tuned to minimize the difference between the input image and all intermediate outputs.

For example, fine-tuning the pre-trained diffusion model includes initializing a noise map, generating an intermediate image based on the noise map using the pre-trained diffusion model, and computing a loss function measuring a difference between the input image and the intermediate image. In the same example, the fine-tuning includes performing these steps repeatedly until the model converges.

According to some embodiments, the parameters of the pre-trained diffusion model may be optimized using the following objective loss function:

$$\|G(\text{Forward}(x,t))-x\| \tag{3}$$

where G is the function modeled by the diffusion model, x represents the input image, Forward function represents the forward process of the diffusion process, and t is a randomly sampled timestep representing the amount of noise injected to the input image x. By fine-tuning parameters of the pre-trained diffusion model to minimize the difference with respect to the input image at all timesteps, the tuned diffusion model is able to generate images that are close variations of the input.

Figure 12:
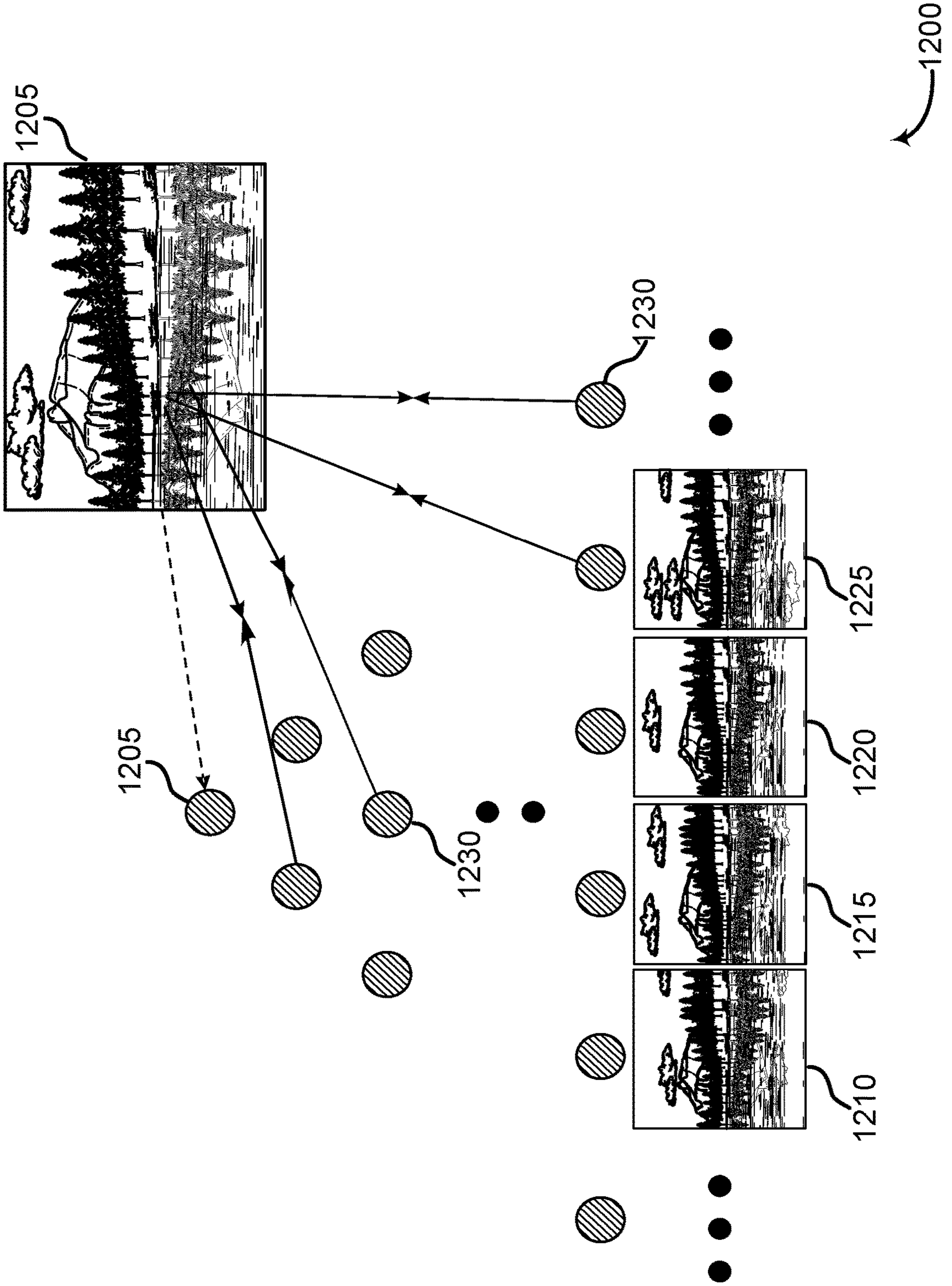
FIG. 12 illustrates an example of fine-tuning a pre-trained diffusion model according to aspects of the present disclosure.

FIG. 12 illustrates an example of a method 1200 for fine-tuning a pre-trained diffusion model according to aspects of the present disclosure. Given target image 1205, a pre-trained diffusion model generates a set of intermediate outputs 1230 at various timesteps. The training system then selects a set of intermediate images 1230 at random from multiple time steps. The selected intermediate images are compared to target image 1205, and a loss function is computed based on the comparison (e.g., using a cross entropy loss, a reconstruction loss or a perceptual loss). In FIG. 12, target image 1205 and the generated intermediate images including selected intermediate images 1230 in the training system are also illustrated as shaded circles. The dashed arrowhead illustrates that target image 1205 is represented as a shaded circle in the training system, and the solid arrowhead pointing towards each other represents a comparison between target image 1205 and selected intermediate images. In some examples, the parameters of the pre-trained diffusion model are fine-tuned to minimize the difference between selected intermediate images and target image 1205. The fine-tuning generates output images 1210, 1215, 1220, and 1225. In this example, output images 1210, 1215, 1220, and 1225 are close variations of the target image 1205 based on the tuning of the diffusion model.

In one embodiment, a pre-trained Stable Diffusion model is used to produce the similar output images, but embodiments of the present disclosure are not limited to Stable Diffusion model and any diffusion-based model that includes a text encoder and an image decoder could be used, including models such as DALL-E2, Imagen, and Stable Diffusion.

During finetuning, a user-uploaded input image can be obtained, and optimization can be performed so that the diffusion-based generator model faithfully reproduces the user image to a controllable degree of precision (i.e., the user can set a parameter that determines the amount of fine-tuning). The optimization can be run on either the text embedding space of the text encoder, or on the weights of the model. In one example, the loss function used in this fine-tuning step is the pixel loss, which penalizes any deviation from the target user image. In some examples, the optimization can be run on either the text embedding or the model weights individually.

Figure 13:
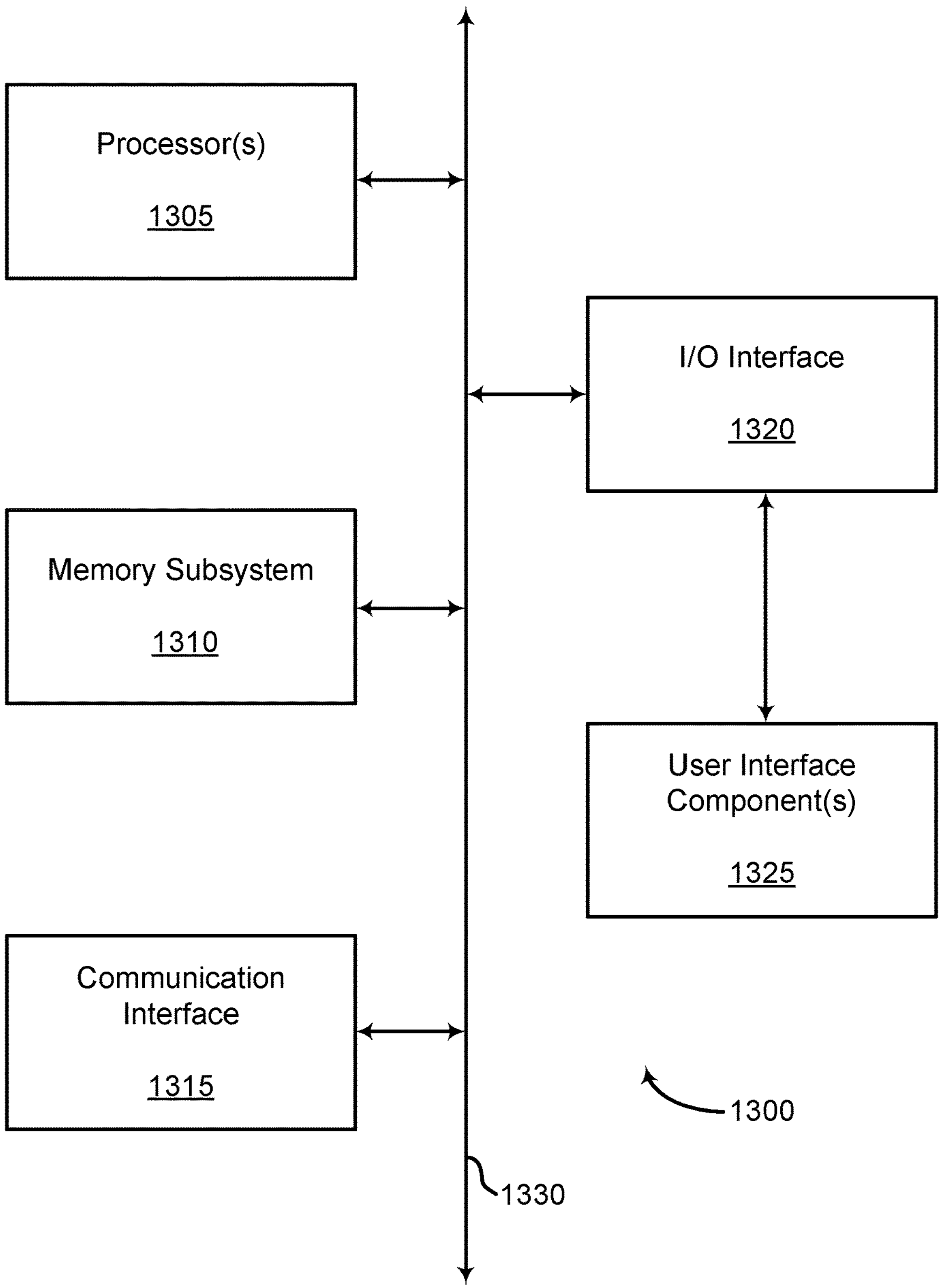
FIG. 13 shows an example of a computing device for generating images according to aspects of the present disclosure.

FIG. 13 shows an example of a computing device for generating images according to aspects of the present disclosure. In one aspect, computing device 1300 includes processor(s) 1305, memory subsystem 1310, communication interface 1315, I/O interface 1320, user interface component(s) 1325, and channel 1330.

In some embodiments, computing device 1300 is an example of, or includes aspects of, image generation apparatus 110 of FIG. 1. In some embodiments, computing device 1300 includes one or more processors 1305 that can execute instructions stored in memory subsystem 1310 for obtaining an image and a prompt for editing the image; encoding the prompt to obtain a guidance vector; and generating a modified image based on the image and the text prompt using a diffusion model that has been trained on the image to generate different versions of the image.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or via hardware components controlled by the I/O controller.

According to some aspects, user interface component(s) 1325 enable a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

Accordingly, systems and methods for image generation are described. One or more aspects of the method include obtaining an image and a prompt for editing the image; encoding the prompt to obtain a guidance vector; and generating a modified image based on the image and the text prompt using a diffusion model that has been trained on the image to generate different versions of the image.

Some examples of the method, apparatus, and non-transitory computer readable medium further include receiving the prompt from a user via a text field of a user interface. Some examples further include displaying the modified image to the user via the user interface.

Some examples of the method, apparatus, and non-transitory computer readable medium further include initializing a plurality of noise maps. Some examples further include generating a plurality of intermediate images at different noise levels corresponding to the plurality of noise maps based on the plurality of noise maps using the diffusion model. Some examples further include computing a loss function by comparing each of the plurality of intermediate images to the image, wherein the diffusion model is based on the loss function.

Some examples of the method, apparatus, and non-transitory computer readable medium further include selecting the plurality of intermediate images at random from a superset of intermediate images generated by the diffusion model.

Some examples of the method, apparatus, and non-transitory computer readable medium further include adding noise at the different noise levels to the image to obtain a plurality of noisy images, wherein the comparison is based on an intermediate image of the plurality of intermediate images and a corresponding noisy image of the plurality of noisy images having a corresponding noise level.

In some aspects, the prompt comprises text that describes a modification to the image, wherein the modified image includes the modification. In some aspects, the modified image retains an identity of an object in the image.

Some examples of the method, apparatus, and non-transitory computer readable medium further include combining the guidance vector with image features within the diffusion model, wherein the modified image is based on the guidance vector.

Some examples of the method, apparatus, and non-transitory computer readable medium further include initializing a diffusion model. Some examples further include training the diffusion model based on a diverse training set to obtain the pre-trained diffusion model. Some examples further include fine-tuning the diffusion model based on the image.

In some aspects, the fine-tuning configures the diffusion model to generate an output resembling the image based on any input provided. In some aspects, a first weight for a loss function is used for training the pre-trained diffusion model and a second weight for the loss function that is different from the first weight is used for fine-tuning a tuned diffusion model.

An apparatus for image generation is described. One or more aspects of the apparatus include fine-tuning a pre-trained diffusion model based on a single image to obtain a tuned diffusion model; receiving a prompt including additional content for the single image; and generating a modified image based on the single image and the prompt using the tuned diffusion model.

Some examples of the apparatus and method further include initializing a plurality of noise maps. Some examples further include generating a plurality of intermediate images corresponding to the plurality of noise maps at different noise levels based on the plurality of noise maps using the pre-trained diffusion model. Some examples further include computing a loss function by comparing each of the plurality of intermediate images to the single image, wherein the tuned diffusion model is based on the loss function.

Some examples of the apparatus and method further include selecting the plurality of intermediate images at random from a superset of intermediate images generated by the pre-trained diffusion model.

Some examples of the apparatus and method further include adding noise at the different noise levels to the single image to obtain a plurality of noisy images, wherein the comparison is based on an intermediate image of the plurality of intermediate images and a corresponding noisy image of the plurality of noisy images having a corresponding noise level.

Some examples of the apparatus and method further include encoding the prompt to obtain a guidance vector. Some examples further include combining the guidance vector with image features within the tuned diffusion model, wherein the modified image is based on the guidance vector.

An apparatus for image generation is described. One or more aspects of the apparatus include one or more processors; one or more memories including instructions executable by the one or more processors to obtain an image and a prompt for editing the image; fine-tuning a pre-trained diffusion model based on the image to obtain a tuned diffusion model; and generating a modified image based on the image and the prompt using the tuned diffusion model.

In some aspects, the instructions are further executable by the one or more processors to encode the prompt to obtain a guidance vector using a text encoder, wherein the modified image is based on the guidance vector.

In some aspects, the instructions are further executable by the one or more processors to receive the prompt from a user via a text field of a user interface, and display the modified image to the user. In some aspects, the diffusion model comprises a DDPM.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an image and a prompt indicating a change to the image;

fine-tuning a pre-trained image generation model with the image as a single target image to obtain a fine-tuned image generation model by generating a plurality of variations of the image independent of the prompt and, for each of the plurality of variations, computing a plurality of loss values corresponding to a plurality of diffusion timesteps, respectively, wherein each of the plurality of loss values is based on a difference between the image and an intermediate image corresponding to one of the plurality of variations of the image at the respective diffusion timestep; and generating, using the fine-tuned image generation model after the fine-tuning, a modified image by denoising a noise map based on the prompt, wherein the modified image depicts the image with the change indicated by the prompt and retains an identity of an object in the image based on the fine-tuning with the image as the single target image.

2. The method of claim 1, further comprising:
receiving the prompt from a user via a text field of a user interface; and
displaying the modified image to the user via the user interface.

3. The method of claim 1, further comprising:
initializing a plurality of noise maps;
generating a plurality of intermediate images corresponding to the plurality of noise maps at different noise levels based on the plurality of noise maps using the image generation model; and
computing a loss function by comparing each of the plurality of intermediate images to the image, wherein the image generation model is based on the loss function.

4. The method of claim 1, wherein:
the prompt comprises text that describes a modification to the image, wherein the modified image includes the modification.

5. The method of claim 1, wherein:
the modified image retains an identity of an object in the image.

6. The method of claim 1, further comprising:
combining a guidance vector with image features within the image generation model, wherein the modified image is based on the guidance vector.

7. The method of claim 1, further comprising:
initializing the image generation model;
training the image generation model based on a diverse training set to obtain a pre-trained image generation model; and
fine-tuning the pre-trained image generation model based on the image.

8. The method of claim 7, wherein:
a first weight for a loss function is used for training the image generation model and a second weight for the loss function that is different from the first weight is used for fine-tuning the pre-trained image generation diffusion model.

9. The method of claim 1, wherein fine-tuning the pre-trained image generation model comprises:
embedding the image in a latent text embedding space, wherein the difference is computed in the latent text embedding space.

10. The method of claim 1, wherein:
the difference is computed between the generated image at the respective diffusion timestep and the image as it was input independent of the respective diffusion timestep.

11. A non-transitory computer-readable medium comprising instructions, that, when executed by a processor, are configured to perform operations of:
fine-tuning a pre-trained image generation model based on an image as a single target image to obtain a tuned image generation model, wherein the fine-tuning is performed by generating a plurality of variations of the image independent of a prompt and, for each of the plurality of variations, computing a plurality of loss values corresponding to a plurality of diffusion timesteps, respectively, wherein each of the plurality of loss values is based on a difference between the image and an intermediate image corresponding to one of the plurality of variations of the image at the respective diffusion timestep;
receiving a prompt including additional content for the single image; and
generating a modified image based on the single image and the prompt using the tuned image generation model after the fine-tuning, wherein the modified image depicts the image with the additional content indicated by the prompt and retains an identity of an object in the image based on the tuning with the image as the single target image.

12. The non-transitory computer-readable medium of claim 11, wherein the instructions are further configured to perform:
initializing a plurality of noise maps;
generating a plurality of intermediate images corresponding to the plurality of noise maps at different noise levels based on the plurality of noise maps using the pre-trained image generation model; and
computing a loss function by comparing each of the plurality of intermediate images to the single image, wherein the tuned image generation model is based on the loss function.

13. The non-transitory computer-readable medium of claim 11, wherein the instructions are further configured to perform:
encoding the prompt to obtain a guidance vector; and
combining the guidance vector with image features within the tuned image generation model, wherein the modified image is based on the guidance vector.

14. An apparatus for image processing, comprising:
one or more processors; and
one or more memories including instructions executable by the one or more processors to:
obtain an image and a prompt indicating a change to the image;
fine-tune a pre-trained image generation model with the image as a single target image based on the image to obtain a tuned image generation model, wherein the fine-tuning is performed by generating a plurality of variations of the image independent of the prompt and, for each of the plurality of variations, computing a plurality of loss values corresponding to a plurality of diffusion timesteps, respectively, wherein each of the plurality of loss values is based on a difference between the image and an intermediate image corresponding to one of the plurality of variations of the image at the respective diffusion timestep; and
generate, using the tuned image generation model after the fine-tuning, a modified image by denoising a noise map based on the prompt, wherein the modified image depicts the image with the change indicated by the prompt and retains an identity of an object in the image based on the fine-tuning with the image as the single target image.

15. The apparatus of claim 14, wherein the instructions are further executable by the one or more processors to:
encode the prompt to obtain a guidance vector using a text encoder, wherein the modified image is based on the guidance vector.

16. The apparatus of claim 14, wherein the instructions are further executable by the one or more processors to:
receive the prompt from a user via a text field of a user interface, and
display the modified image to the user.

17. The apparatus of claim 14, wherein:
the image generation model comprises a Denoising Diffusion Probabilistic Model (DDPM).

* * * * *